US00RE34868E

United States Patent [19]

[11] E

Patent Number: Re. 34,868

Vander Stel et al.

[45] Reissued Date of Patent: Feb. 28, 1995

[54] BUILT-IN INFANTS SEAT FOR VEHICLES

[76] Inventors: Louis M. Vander Stel; Polly A. Vander Stel, both of 8601 - 60th St., Alto, Mich. 49302

[21] Appl. No.: 27,701

[22] Filed: Mar. 8, 1993

Related U.S. Patent Documents

Reissue of:

[64] Patent No.: 5,026,118
Issued: Jun. 25, 1991
Appl. No.: 534,473
Filed: Jun. 7, 1990

[51] Int. Cl.[6] ..... B60N 2/30

[52] U.S. Cl. ..... 297/238; 297/488

[58] Field of Search ..... 297/238, 14, 487, 488, 297/112, 115, 250.1

[56] References Cited

U.S. PATENT DOCUMENTS

| | | | |
|---|---|---|---|
| 2,337,480 | 12/1943 | Logan . | |
| 3,146,026 | 8/1964 | Berlin . | |
| 3,166,355 | 1/1965 | Rocker . | |
| 3,594,037 | 7/1971 | Sherman . | |
| 4,230,366 | 10/1980 | Ruda . | |
| 4,460,215 | 7/1984 | Chamberlain et al. | 297/14 |
| 4,533,176 | 8/1985 | Wyttenbach | 297/238 |
| 4,540,216 | 9/1985 | Hassel, Sr. | 297/238 |
| 4,596,420 | 6/1986 | Vaidya | 297/238 X |
| 4,664,443 | 5/1987 | Casale . | |
| 4,690,455 | 9/1987 | Bailey et al. . | |
| 4,722,568 | 2/1988 | Irvin . | |
| 4,749,229 | 6/1988 | Dorto . | |
| 4,756,573 | 7/1988 | Simin et al. . | |
| 4,900,086 | 2/1990 | Steward | 297/238 |
| 4,902,069 | 2/1990 | Lehnert . | |
| 4,943,112 | 7/1990 | Law . | |
| 4,986,600 | 1/1991 | Leblanc et al. | 297/238 |
| 5,026,118 | 6/1991 | Vander Stel et al. . | |

*Primary Examiner*—Peter R. Brown
*Attorney, Agent, or Firm*—Price, Heneveld, Cooper, DeWitt & Litton

[57] ABSTRACT

A seating unit for accommodating an adult in a seated position and having a child restraint seat convertible from a position stored within the back of the adult seat to a position for holding and restraining a child. The child restraint seat has a generally U-shaped restraint bar member which extends horizontally from the seat back in the open position and which pivots about the ends of the legs to a vertical closed position, wherein the restraint bar lays flush with the forward surface of the seat back and the bight portion of the U shape forms the top edge of the seat back. The child seat also has a seat cushion portion which pivots about its lower edge to lay horizontally in the opened position upon the adult seat and which pivots vertically to lay flush in the seat back and nest between the legs of the restraint bar in the closed position.

34 Claims, 2 Drawing Sheets

BUILT-IN INFANTS SEAT FOR VEHICLES

Matter enclosed in heavy brackets [ ] appears in the original patent but forms no part of this reissue specification; matter printed in italics indicates the additions made by reissue.

BACKGROUND OF THE INVENTION

The present invention relates to child restraint seats. Such seats are most widely known in use with automobiles. However, the present invention is also applicable to vehicles generally, such as busses, planes, trains and boats for example, and to theater seating and the like.

In typical use in automobiles for example, a child restraint seat is a bulky, rigid apparatus into which a child is strapped and which is fastened in a seating position in a car. Because the devices are bulky and are bothersome to remove and replace, child restraint seats are typically left in place in the car for the child's use. Only when circumstances necessitate the use of the seating position by an adult, is the child seat generally removed from the car. Child restraint seats are thus seen as somewhat of a necessary nuisance, typically reserved for use in cars and seldom, if ever, used in other types of vehicles or with other types of seating. While social acceptance and legislative requirements for the use of child restraint seats in cars is commonplace, there is also social and legislative interest in requiring their use in other vehicles, including busses, planes and trains.

While the desirability of an adult seat which is convertible to a child restrain seat is apparent, attempts to supply this need have had their own limitations and problems. The patent to Dorto (U.S. Pat. No. 4,749,229) for example, discloses a device which inherently limits its utility by creating an overhead obstruction to the child who uses the seat, requiring the child to be of sufficiently small size to sit within a recessed area in the back of an adult seat. The same problem is found in the patents to Irvin (U.S. Pat. No. 4,722,568) and to Hassel, Sr. (U.S. Pat. No. 4,540,216) for example. Other devices, such as the one shown in the patent to Casale (U.S. Pat. No. 4,664,443), are impractical because they require excess volumes of space.

SUMMARY OF THE INVENTION

The present invention addresses these problems with a practical seating unit for accommodating an adult in a seated position and having a child restraint seat convertible from a position stored within the back of the adult seat to a position for holding and restraining a child. The child seat of the present invention includes two portions of the adult seat back which pivot forward to form a child seat cushion and a restraint bar and which pivot closed to form a smooth back support for an adult seating position. The restraint bar portion generally resembles an inverted U in the closed position with the bight portion positioned to form the top edge of the adult seat back. Thus, a height restricting portion of the back does not remain when the child seat is deployed. The child seat cushion portion folds into a closed position to nest inside the closed restraint bar portion and forms the mid and lower back support for the adult seating position.

In one aspect of the invention, the child restraint bar and seat cushion are mounted to a framework such that the seat cushion can be slid forward, inclining the child seat back and providing a reclined seating position for the child.

These and other objects, advantages and features of the present invention will become apparent upon review of the following specification in conjunction with the drawings.

DESCRIPTION OF THE PREFERRED EMBODIMENT

Figure 1:
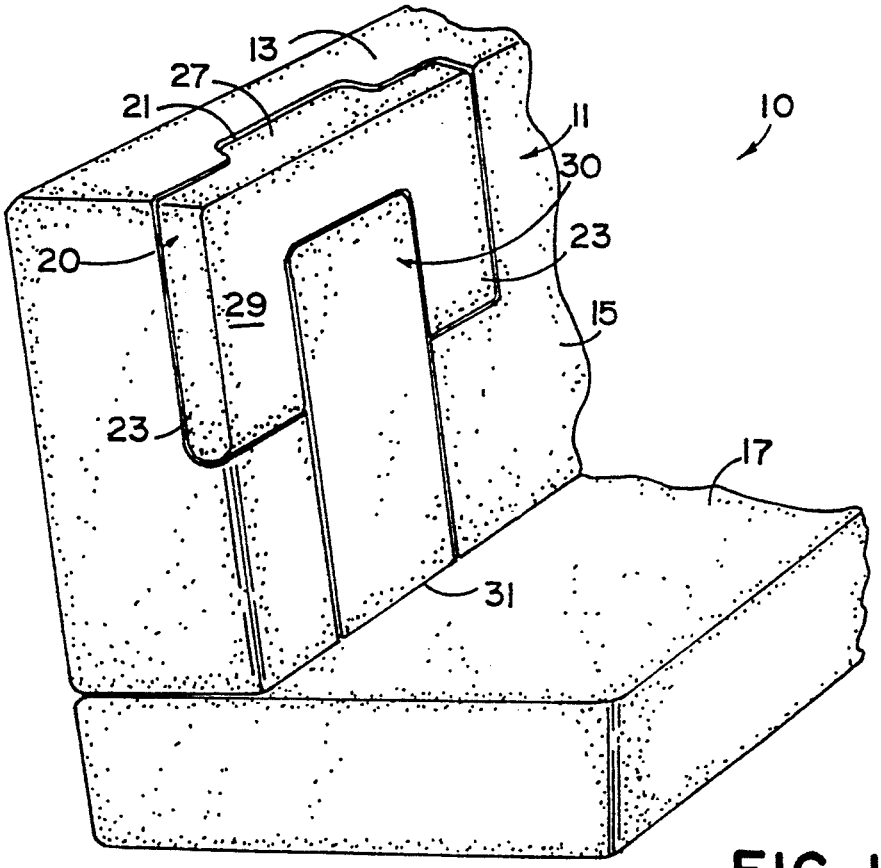
FIG. 1 is a perspective view of the invention in the closed position.

Referring to the drawings in greater detail, the seating unit 10 of the present invention has a restraint bar 20 and a child seat cushion 30 which are mounted with a frame 40 for folding into a closed position to become a part of an adult seat back 11.

Figure 2:
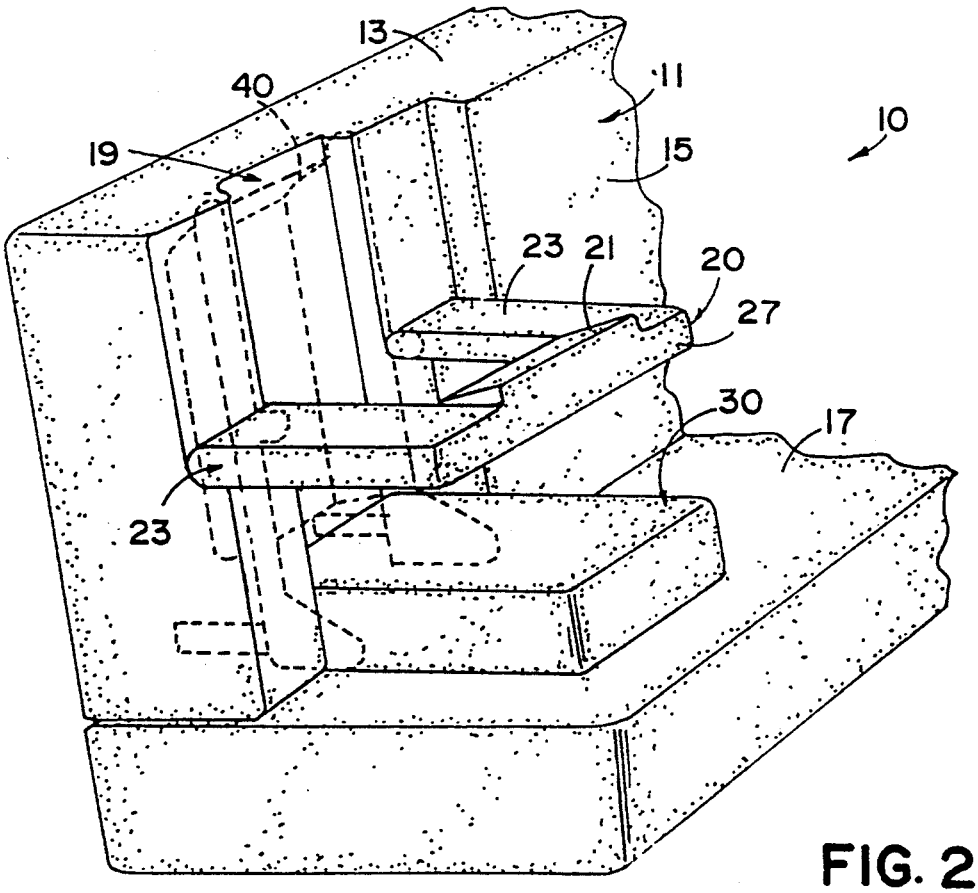
FIG. 2 is a perspective view of the invention in the opened position.
Figure 3:
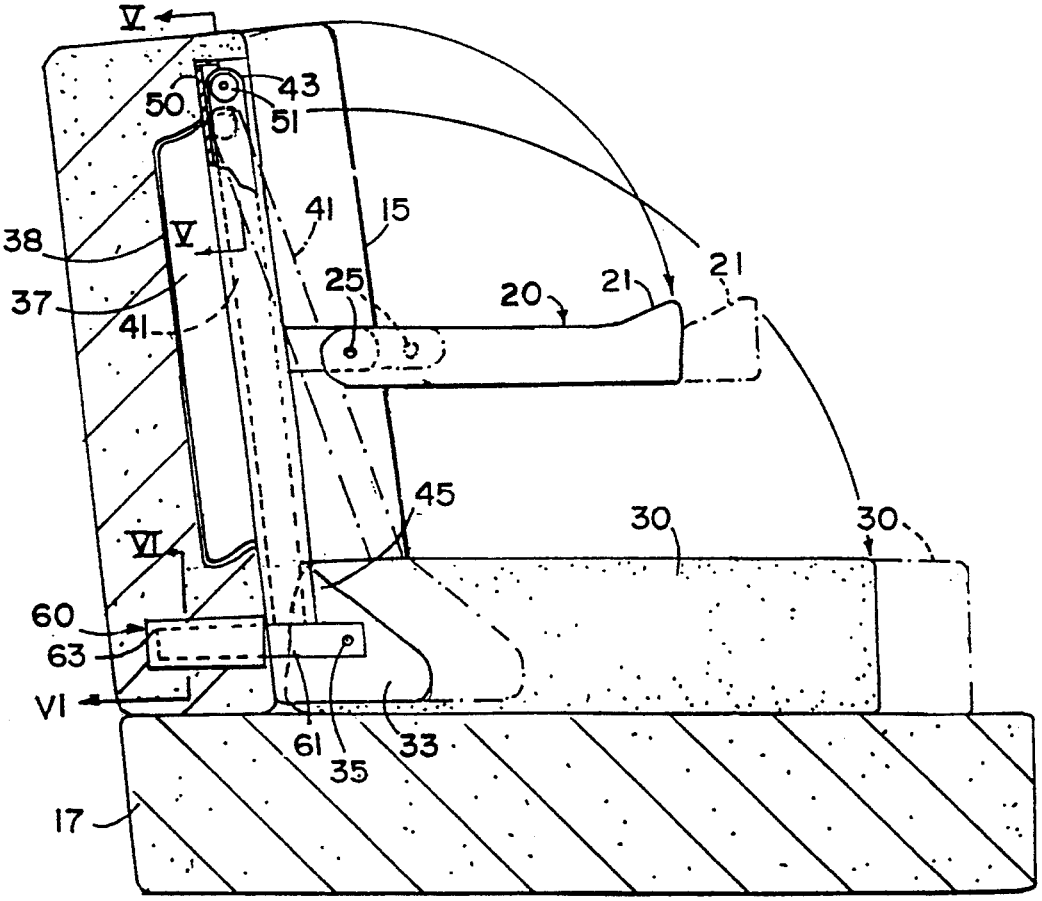
FIG. 3 is a side elevation view of the structural framework of the invention.
Figure 4:
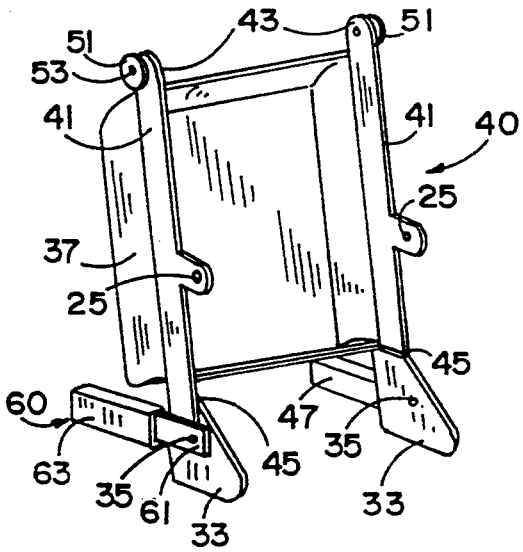
FIG. 4 is a perspective view of the structural framework of the invention.

Restraint bar 20 is a generally U-shaped member which is built-up with safety padding and upholstery as shown in FIGS. 1 and 2. A wedge portion 21 on bar 20 is built-up with an extra thickness of padding to provide added safety to a child by presenting a larger surface area and a deeper padding in the area where a child's face might contact the bar in a sudden stop or accident. Bar 20 has legs 23 and is pivotally fastened to frame 40 at pivots 25 (FIG. 3), near the ends of legs 23. Bar 20 canpivot between an opened horizontal position (FIG. 2) and a closed vertical position (FIG. 1). In the opened position, bar 20 surrounds a child using seating unit 10, restraining the child. The restraining properties of bar 20 are preferably supplemented by a typical child restraint harness. In the closed position, bar 20 is folded into back 11 with an edge surface 27 flush with a top surface 13 of back 11, and a face surface 29 of bar 20 flush with a face surface 15 of back 11. Child seat cushion 30 also pivots between an opened horizontal position (FIG. 2) and a closed vertical position (FIG. 1). Cushion 30 is pivotally attached at each side and near its lower edge 31 to frame 40 at pivots 35. A framing plate 33, shown in FIGS. 3 and 4, is built into each side of cushion 30 near edge 31. Plates 33 pivot wih cushion 30 and provide a foundation for pivotally connecting the cushion to frame 40.

Figure 5:
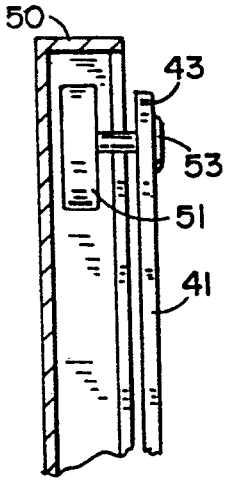
FIG. 5 is a section view along plane V—V of FIG. 3.
Figure 6:
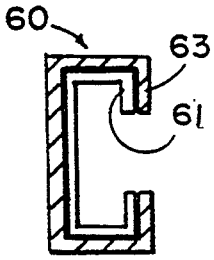
FIG. 6 is a section view along plane VI—VI of FIG. 3.

Frame 40 has two vertical side braces 41 which are pivotally connected, near their upper end 43, to back 11 via vertically sliding tracks 50 (FIG. 5) such that the lower ends 45 of braces 41 can pivot away from back 11 and upper ends 43 of braces 41 can slide down the tracks. Tracks 50 are elongated channels having a "C" cross-section for retaining a slide, preferably a wheel 51, which in turn is pivotally connected to upper end 43 of side brace 41 by a stub axle 53. Lower ends 45 of braces 41 are pivotally connected at pivots 35 to one end of telescoping rods 60. As shown in FIG. 6, an inner "C"-sectioned channel 61 is slidably retained within an outer "C"-sectioned channel 63 to provide a telescoping action. With a channel 61 pivotally connected at an end to a plate 33, an opposing end of channel 63 is pivotally anchored in back 11. A child seat back foundation 37 extends between braces 41 and is located in the recess 38 (FIG. 3) behind the restraint bar 20 and cushion 30. Foundation 37 is preferably made from a sheet of 16 gauge steel which is bent to form a two inch deep basket behind braces 41 and which is welded along each side to braces 41.

In operation, unit 10 is opened by pivoting cushion 30 forward about edge 31 until cushion 30 is in a horizontal position, laying on adult seat 17. Restraint bar 20 is likewise opened by pivoting forward about pivots 25 until bar 20 is cantilevered forward in a horizontal position. An upholstered recessed area 19 is revealed in back 11 when bar 20 and cushion 30 are opened and forms the back for the child seat. Cushion 30 is pulled forward and rods 60 telescope to adjust the incline of the child seat back. A child is placed between legs 23 of bar 20 to sit upon cushion 30. The child is preferably strapped into seat 10 with a typical child restraint harness.

While a preferred form of the invention has been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A seating unit for accommodating an adult in a seated position and having a child restraint seat convertible from a position stored within the back of said adult seat to a position for holding and restraining a child, comprising:

said adult seating unit having a seat and a back;

said back including a first back portion separable from the remainder of said back and in a first position extending upwardly from said seat and normally providing a portion of the back support for an adult; said first back portion being pivotally mounted at its lower end adjacent said seat permitting it to be pivoted downwardly to a second position extending forwardly from said back to form a seat for a child; said back portion being dimensioned so that when pivoted upwardly to form a portion of said back the upper edge of said first back portion is spaced a distance below the remaining edge of said back;

a second back portion having an inverted U shape with two legs and a bight portion extending between said legs; said second back portion in a first position having its legs extending downwardly and contiguous to each side of said first back portion and its bight portion extending along the top edge of said first back portion thereby providing a portion of said back support for an adult, said second back portion extending upwardly when in said first portion;

an indented space in said back behind said first back portion and second back portion;

a child's back support normally located within the indented space behind both of said first back portion and second back portion;

means associated with the second back portion and said upper edge of said back whereby when said upper back portion is pivoted to said second position a void is provided along said upper edge of said back thereby exposing the entire vertical length of said child's back support for accommodating the upper part of a tall child;

means for pivotally mounting said U-shaped second back portion to a second position extending substantially perpendicular to said back;

a means in said back for pivoting the top of said child back support for moving the lower end of said child's back support so as to tip said child's back support to a position for receiving and supporting a child in an inclined position when said first and second back portions are pivoted downwardly from the normal adult support first positions to said second positions whereby said child can sit on said first back portion and rest against said child's back support in an inclined position and is restrained by the U-shaped second back portion.

2. A seating unit for accommodating an adult in a seated position and having a child restraint seat convertible from a position stored within the back of said adult seat to a position for holding and restraining a child, comprising:

said adult seating unit having a seat and a back;

said back including a first back portion separable from the remainder of said back and in a first position extending upwardly from said seat and normally providing a portion of the back support for an adult; said first back portion being pivotally mounted at its lower end adjacent said seat permitting it to be pivoted downwardly to a second position extending forwardly from said back to form a seat for a child; said back portion being dimensioned so that when pivoted upwardly to form a portion of said back the upper edge of said first back portion is spaced a distance below the remaining edge of said back;

a second back portion having an inverted U shape with two legs and a bight portion extending between said legs; said second back portion in a first position having its legs exgending downwardly and contiguous to each side of said first back portion and its bight portion extending along the top edge of said first back portion thereby providing a portion of said back support for an adult;

means for pivotally mounting said U-shaped second back portion to a second position extending substantially perpendicular to said back;

a child's back support normally located behind said first back portion; and a means in the back for movably mounting said child's back support to a position for receiving a child when said first and second back portions are pivoted downwardly from the normal adult support first positions to said second positions whereby said child can sit on said first back portion and rest against said child's back support and is restrained by the U-shaped second back portion;

said means for pivotally mounting said U-shaped second back portion including a first vertical side member, having an upper end attached within said back near said upper edge, having a lower end pivotally attached to a first side of said lower end of said first back portion and having one of said two legs of said second back portion attached at the end of said leg to the midportion of said member; and a second vertical side member, parallel to said first member and having an upper end attached within said back near said upper edge, having a lower end pivotally attached to the other side of said lower end of said first back portion and having the other of said two legs of said second back portion attached at the end of said leg to the midportion of said second member.

3. The seating unit of claim 2 wherein said mounting means further includes a foundation means for supporting said child's back support, said foundation extending between said first and second side members.

4. The seating unit of claim 2 wherein each said upper end of said vertical side members is pivotally connected to a verticaly slidable fastening means within said back.

5. A seating unit for accommodating an adult in a seated position and having a child restraint seat convertible from a position stored within the back of said adult seat to a position for holding and restraining a child, comprising:

said adult seating unit having a seat and a back;

said back including a first back portion separable from the remainder of said back and in a first position extending upwardly from said seat and normally providing a portion of the back support for an adult; said first back portion being pivotally mounted at its lower end adjacent said seat permitting it to be pivoted downwardly to a second position extending forwardly from said back to form a seat for a child; said back portion being dimensioned so that when pivoted upwardly to form a portion of said back the upper edge of said first back portion is spaced a distance below the remaining edge of said back;

a second back portion having an inverted U shape with two legs and a bight portion extending between said legs; said second back portion in a first position having its legs extending downwardly and contiguous to each side of said first back portion and its bight portion extending along the top edge of said first back portion thereby providing a portion of said back support for an adult;

means for pivotally mounting said U-shaped second back portion to a second position extending substantially perpendicular to said back;

a child's back support normally located behind said first back portion; and a means in the back for movably mounting said child's back support to a position for receiving a child when said first and second back portions are pivoted downwardly from the normal adult support first positions to said second positions whereby said child can sit on said first back portion and rest against said child's back support and is restrained by the U-shaped second back portion; said movably mounting means including a first horizontal side member located generally in a first reference plane which is substantially perpendicular to the plane of said back, said member having a first end pivotally fastened within said back such that said member can pivot within said first reference plane and having a second end which can telescope to effectively extend the length of said member and which is pivotally attached to a first side of said lower end of said first back portion; and a second horizontal side member located generally in a second reference plane which is parallel to said first reference plane, said member having a first end pivotally fastened with said back such that said member can pivot within said second reference plane and having a second end which can telescope to effectively extend the length of said member and which is pivotally attached to the other side of said lower end of said first back portion.

6. A seating unit for accommodating an adult in a seated position and having a child restraint seat convertible from a position stored within the back of said adult seat to a position for holding and restraining a child, comprising:

said adult seating unit having a seat and a back;

said back including a first back portion separable from the remainder of said back and in a first position extending upwardly from said seat and normally providing a portion of the back support for an adult; said first back portion being pivotally mounted at its lower end adjacent said seat permitting it to be pivoted downwardly to a second position extending forwardly from said back to form a seat for a child; said back portion being dimensioned so that when pivoted upwardly to form a portion of said back the upper edge of said first back portion is spaced a distance below the remaining edge of said back;

a second back portion having an inverted U shape with two legs and a bight portion extending between said legs; said second back portion in a first position having its legs extending downwardly and contiguous to each side of said first back portion and its bight portion extending along and contiguous to the top edge of said first back portion thereby providing a portion of said back support for an adult;

means for pivotally mounting said U-shaped second back portion to a second position extending substantially perpendicular to said back;

a child's back support normally located behind said first back portion; and means in said back for moving the lower end of said child's back support so as to tip said child's back support and support a child in a slightly laid back position when said first and second back portions are pivoted downwardly from the normal adult support first positions to said second positions whereby said child can sit on said first back portion and rest against said child's back support and is restrained by the U-shaped second back portion;

said means for pivotally mounting said U-shaped second back portion including a first vertical side member, having an upper end attached within said back near said upper edge, having a lower end pivotally attached to a first side of said lower end of said first back portion and having one of said two legs of said second back portion attached at the end of said leg to the midportion of said member; and a second vertical side member, parallel to said first member and having an upper end attached with said back near said upper edge, having a lower end pivotally attached to the other side of said lower end of said first back portion and having the other of said two legs of said second back portion attached at the end of said leg to the midportion of said second member.

7. The seating unit of claim 6 wherein said mounting means further includes a foundation means for supporting said child's back support, said foundation extending between said first and second side members.

8. The seating unit of claim 6 whrein each said upper end of said vertical side members is pivotally connected to a vertically slidable fastening means within said back.

9. A seating unit for accommodating an adult in a seated position and having a child restraint seat convertible from a position stored within the back of said adult seat to a position for holding and restraining a child, comprising:

said adult seating unit having a seat and a back;

said back including a first back portion separable from the remainder of said back and in a first position extending upwardly from said seat and normally providing a portion of the back support for an adult; said first back portion being pivotally mounted at its lower end adjacent said seat permitting it to be pivoted downwardly to a second position extending forwardly from said back to form a seat for a child; said back portion being dimensioned so that when pivoted upwardly to form a portion of said back the upper edge of said first back portion is spaced a distance below the remaining edge of said back;

a second back portion having an inverted U shape with two legs and a bight portion extending between said legs; said second back portion in a first position having its legs extending downwardly and contiguous to each side of said first back portion and its bight portion extending along and contiguous to the top edge of said first back portion thereby providing a portion of said back support for an adult;

means for pivotally mounting said U-shaped second back portion to a second position extending substantially perpendicular to said back;

a child's back support normally located behind said first back portion; and means in said back for moving the lower end of said child's back support so as to tip said child's back support and support a child in a slightly laid back position when said first and second back portions are pivoted downwardly from the normal adult support first positions to said second positions whereby said child can sit on said first back portion and rest against said child's back support and is restrained by the U-shaped second back portion;

said movable mounting means including a first horizontal side member located generally in a first reference plane which is substantially perpendicular to the plane of said back, said member having a first end pivotally fastened within said back such that said member can pivot within said first reference plane and having a second end which can telescope to effectively extend the length of said member and which is pivotally attached to a first side of said lower end of said first back portion; and a second horizontal side member located generally in a second reference plane which is parallel to said first reference plane, said member having a first end pivotally fastened within said back such that said member can pivot within said second reference plane and having a second end which can telescope to effectively extend the length of said member and which is pivotally attached to the other side of said lower end of said first back portion.

10. A child restraint seat, being convertible to store within the back of an adult seat, comprising:

said adult seat having a seat and a back, said back having an upper edge and a lower edge;

a first horizontal side member located generally in a first reference plane which is substantially perpendicular to the plane of said back; said member having a first end pivotally fastened within said back, near said lower edge, such that said member can pivot within said first reference plane; and said member having a second end which can telescope to effectively extend the length of said member;

a first vertical side member located generally in said first reference plane, said member having a first end pivotally connected to said second end of said horizontal side member and having a second end pivotally connected to a vertically slidable fastening means within said back, near said upper edge;

a seconnd horizontal side member located generally in a second reference plane which is parallel to said first reference plane; said member having a first end pivotally fastened within said back, near said lower edge, such that said member can pivot within said second reference plane; and said member having a second end which can telescope to effectively extend the length of said member;

a second vertical side member located geerally in said second reference plane, said member having a first end pivotally connected to said second end of said second horizontal member and having a second end pivotally connected to a vertically slidable fastening means within said back, near said upper edge;

said first and second reference planes being spaced laterally from one another whereby said first horizontal side member and said first vertical side member will be located on one side of a child occupying said child seat and said second horizontal side member and said second vertical side member will be located on the opposite side of such child;

a generally U-shaped restraining bar, having two leg portions and a bight portion extending between said legs, the end of each one of said two legs being pivotally connected to the midportion of said first vertical side member and the end of the other of said two legs being pivotally connected to the midportion of said second vertical side member; said restraining bar being pivotable vertically to closed position wherein said bight portion is flush with the top edge of said back and said bar is recessed flush within said back; and said restraining bar being pivotable horizontally to an open position wherein said bar extends horizontally from said back;

a child seat member pivotally connected near one end between said second ends of said first and second horizontal side members; said child seat member being pivotable vertically to a closed position wherein said child seat nests inside said closed restraining bar and wherein said seat is recessed flush within said back; and said child seat member being pivotable horizontally to an open position wherein said child seat extends horizontally from said back, laying upon said adult seat; and a child's back support foundation connected between said vertical side members and generally extending the length of said vertical side members.

*11. A child seat comprising:*

*a frame having a frame top and an opposing frame bottom;*

*a child seat cushion defined by a portion of an adult seat back, separable from the remainder of the adult seat back, and pivotally connected with said frame, near said frame bottom to pivot between a closed position, in which said child seat cushion is positioned generally flush within the adult seat back to provide support for the back of an adult user, and an open position, in which said child seat cushion extends generally horizontally forward from the adult seat back to provide a child seat for a child user;*

*a child back support connected with said frame and positioned generally within the adult seat back, adjacent said child seat cushion when said child seat cushion is in said closed position;*

*a pivot connected between said frame, near said frame top, and the adult seat back, so said frame rotates about said pivot; and*

*a slide connected between said pivot and one of said frame and the adult seat back, so said frame bottom extends generally horizontally away from a bottom of the adult seat back and retracts generally horizontally into the bottom of the adult seat back when said frame rotates about said pivot, whereby said frame and said child back support rotate and slide to selectively incline said child back support between relatively more upright and relatively more inclined positions and to slide said child seat cushion generally horizontally away from and toward the bottom of the adult seat back when said child seat cushion is in said open position.*

*12. A child seat comprising:*

*a frame having a frame lower end and an extendable member extending from said frame lower end;*

*a child seat cushion defined by a portion of an adult seat back, separable from the remainder of the adult seat back, and pivotally connected with said frame to pivot between a closed position, in which said child seat cushion is positioned generally flush within the adult seat back to provide support for the back of an adult user, and an open position, in which said child seat cushion extends generally horizontally forward from the adult seat back to provide a child seat for a child user;*

*a child back support connected with said frame and positioned generally within the adult seat back, adjacent said child seat cushion when said child seat cushion is in said closed position;*

*a pivot connected between said frame and the adult seat back, said extensible member of said frame having a first end pivotally connected with said frame and an opposing end pivotally connected with the adult seat back at a location generally vertically spaced below said pivot connected between said frame and the adult seat back; and*

*a slide connected between said pivot and one of said frame and the adult seat back, so said frame and said child back support rotate and slide to selectively incline said child back support for receiving and supporting a child in a selected inclined position when said child seat cushion is pivoted to said open position.*

*13. The seat defined in claim 12 wherein:*

*said child seat has a first side and an opposing second side;*

*said extensible member is a first extensible member and positioned near said first side of said child seat; and*

*said frame further includes a second extensible member extending from said frame lower end and positioned near said second side of said child seat, said second extensible member having a first end pivotally connected with said frame and an opposing end pivotally connected with the adult seat back at a location generally vertically spaced below said pivot connected between said frame and the adult seat back.*

*14. The seat defined in claim 13 wherein said frame further includes a foundation extending between said first and said second side of said child seat to support said child back support.*

*15. The seat defined in claim 13 wherein said slide includes a slide member and a cooperating track.*

*16. A child seat having a first side and an opposing second side, comprising:*

*a frame;* a child seat cushion defined by a portion of an adult seat back, separable from the remainder of the adult seat back, and pivotally connected with said frame to pivot between a closed position, in which said child seat cushion is positioned generally flush within the adult seat back to provide support for the back of an adult user, and an open position, in which said child seat cushion extends generally horizontally forward from the adult seat back to provide a child seat for a child user;

*a child back support connected with said frame and positioned generally within the adult seat back, adjacent said child seat cushion when said child seat cushion is in said closed position;*

*a pivot connected between said frame and the adult seat back; and*

*a slide including a slide member and a cooperating track, said slide being connected between said pivot and one of said frame and the adult seat back whereby said frame and said child back support rotate and slide to incline said child back support for receiving and supporting a child in an inclined position when said child seat cushion is pivoted to said open position;*

*said frame further including a first brace having an upper end connected with said pivot near an upper edge of the adult seat back, and having an opposing lower end, said first brace being connected with said child back support near said first side of said child seat; including a first rod positioned near said first side of said child seat, said first rod having an end pivotally connected with said lower end of said first brace and having an opposing end pivotally connected with the adult seat back at a location generally vertically spaced below said upper end of said first brace; including a second brace having an upper end connected with said pivot and an opposing lower end, said second brace being positioned near said second side of said child seat; and including a second rod positioned near said second side of said child seat, said second rod having an end pivotally connected with said lower end of said second brace and having an opposing end pivotally connected with the adult seat back at a location generally vertically spaced below said upper end of said second brace;*

*said child seat cushion having an edge and being pivotally connected near said edge with each of said first brace and said second brace;*

*each of said first rod and said second rod is a telescoping member so said child seat cushion slides between an extended position and a retracted position relative to the adult seat back.*

*17. A child seat having a first side and an opposing second side, comprising:*

*a frame;*

*a child seat cushion defined by a portion of an adult seat back, separable from the remainder of the adult seat back, and pivotally connected with said frame to pivot between a closed position, in which said child seat cushion is positioned generally flush within the adult seat back to provide support for the back of an adult user, and an open position, in which said child seat cushion extends generally horizontally forward from the adult seat back to provide a child seat for a child user; and*

*a child back support connected with said frame and positioned generally within the adult seat back, adjacent said child seat cushion when said child seat cushion is in said closed position;*

*a pivot connected between said frame and the adult seat back; and*

*a slide connected between said pivot and one of said frame and the adult seat back, so said frame and said child back support rotate and slide to incline said child back support for receiving and supporting a child in an inclined position when said child seat cushion is pivoted to said open position;*

*said frame further including a first brace having an upper end connected with said pivot near an upper edge of the adult seat back, and having an opposing lower end, said first brace being connected with said child back support near said first side of said child seat; including a first rod positioned near said first side of said child seat, said first rod having an end pivotally connected with said lower end of said first brace and having an opposing end pivotally connected with the adult seat back at a location generally vertically spaced below said upper end of said first brace; including a second brace having an upper end connected with said pivot and an opposing lower end, said second brace being positioned near said second side of said child seat; and including a second rod positioned near said second side of said child seat, said second rod having an end pivotally connected with said lower end of said second brace and having an opposing end pivotally connected with the adult seat back at a location generally vertically spaced below said upper end of said second brace;*

*said child seat cushion having an edge and being pivotally connected near said edge with each of said first brace and said second brace;*

*each of said first brace and said second brace slides along said slide and rotates about said pivot so said child back support rotates and slides generally vertically to incline said child back support.*

*18. The seat defined in claim 17 wherein each of said first rod and said second rod is a telescoping member so said child seat cushion slides between an extended position and a retracted position relative to the adult seat back.*

*19. The seat defined in claim 12 wherein said slide includes a slide member and a cooperating track.*

*20. A child seat comprising:*

*a frame;*

*a child seat cushion defined by a portion of an adult seat back, separable from the remainder of the adult seat back, and pivotally connected with said frame to pivot between a closed position, in which said child seat cushion is positioned generally flush within the adult seat back to provide support for the back of an adult user, and an open position, in which said child seat cushion extends generally horizontally forward from the adult seat back to provide a child seat for a child user;*

*a child back support connected with said frame and positioned generally within the adult seat back, adjacent said child seat cushion when said child seat cushion is in said closed position;*

*a pivot connected between said frame and the adult seat back; and*

*a slide including a slide member and a cooperating track, said slide being connected between said pivot and one of said frame and the adult seat back, so said frame and said child back support rotate and slide to incline said child back support for receiving and supporting a child in an inclined position when said child seat cushion is pivoted to said open position;*

*said frame further including a brace having an upper end connected with said pivot near an upper edge of said adult seat back, and having an opposing lower end, said child back support being connected with said brace; and including a rod having an end pivotally connected with said lower end of said brace and having an opposing end pivotally connected with the adult seat back at a location generally vertically spaced below said upper end of said brace, said child seat cushion having an edge and being pivotally connected near said edge with said rod, said rod is a telescoping member so said child seat cushion slides between an extended position and a retracted position relative to the adult seat back.*

*21. A child seat comprising:*

*a frame;*

*a child seat cushion defined by a portion of an adult seat back, separable from the remainder of the adult seat back, and pivotally connected with said frame to pivot between a closed position, in which said child seat cushion is positioned generally flush within the adult seat back to provide support for the back of an adult user, and an open position, in which said child seat cushion extends generally horizontally forward from the adult seat back to provide a child seat for a child user;*

*a child back support connected with said frame and positioned generally within the adult seat back, adjacent said child seat cushion when said child seat cushion is in said closed position;*

*a pivot connected between said frame and the adult seat back; and*

*a slide connected between said pivot and one of said frame and the adult seat back, so said frame and said child back support rotate and slide to incline said child back support for receiving and supporting a child in an inclined position when said child seat cushion is pivoted to said open position;*

*said frame further including a brace having an upper end connected with said pivot near an upper edge of the adult seat back,and having an opposing lower end, said child back support being connected with said first member; and including a rod having an end pivotally connected with said lower end of said brace and having an opposing end pivotally connected with the adult seat back at a location generally vertically spaced below said upper end of said brace, said child seat cushion having an edge and being pivotally connected near said edge with said rod;*

*said brace slides along said slide and rotates about said pivot so said child back support rotates and slides generally vertically to incline said child back support.*

*22. The seat defined in claim 21 wherein said rod is a telescoping member so said child seat cushion slides between an extended position and a retracted position relative to the adult seat back.*

*23. An adult back portion of an adult seating unit, having a child seat convertible from a closed position within said adult back portion to an open position for accommodating a child user, comprising:*

*a frame having a frame top and an opposing frame bottom;*

*a child seat cushion defined by a portion of said adult back portion, separable from the remainder of said adult back portion, and pivotally connected with said frame, near said frame bottom, to pivot between a closed position, in which said child seat cushion is positioned generally flush within said adult back portion to provide support for the back of an adult user, and an open position, in which said child seat cushion extends generally horizontally forward from said adult back portion to provide a child seat for a child user;*

*a child back support defined by a second portion of said adult back portion, connected with said frame, and positioned generally within said adult back portion, adjacent said child seat cushion, when said child seat cushion is in said closed position;*

*a pivot connected between said frame, near said frame top, and said adult back portion, near an upper edge of said adult back portion, so said frame rotates about said pivot; and*

*a slide connected between said pivot and one of said frame and said adult back portion, so said frame bottom extends generally horizontally away from a bottom of said adult back portion and retracts generally horizontally into said bottom of said adult back portion with rotation of said frame about said pivot, whereby said child back support rotates and slides to selectively incline said child back support between relatively more upright and relatively more inclined positions and to slide said child seat cushion generally horizontaly away from and toward said bottom of said adult seat back portion when said child seat cushion is in said open position.*

*24. An adult back portion of an adult seating unit, having a child seat convertible from a closed position within said adult back portion to an open position for accommodating a child user, comprising:*

*a frame having a frame lower end and at least one extensible member extending from said frame lower end;*

*a child seat cushion defined by a portion of said adult back portion, separable from the remainder of said adult back portion, and pivotally connected with said frame to pivot between a closed position, in which said child seat cushion is positioned generally flush within said adult back portion to provide support for the back of an adult user, and an open position, in which said child seat cushion extends generally horizontally forward from said adult back portion to provide a child seat for a child user;*

*a child back support defined by a second portion of said adult back portion, connected with said frame, and positioned generally within said adult back portion, adjacent said child seat cushion, when said child seat cushion is in said closed position;*

*a pivot connected between said frame and said adult back portion, near an upper edge of said adult back portion, said extensible member of said frame having a first end pivotally connected with said frame and an opposing end pivotally connected with said adult back portion at a location generally vertically spaced below said pivot connected between said frame and said adult back portion; and*

*a slide connected between said pivot and one of said frame and said adult back portion, so said child back support rotates and slides to selectively incline said child back support for receiving and supporting a child in a selected inclined position.*

*25. The adult back portion defined in claim 24 wherein said child seat cushion has an edge and is pivotally connected near said edge with said frame.*

*26. The adult back portion defined in claim 25 wherein said side includes a slide member and a cooperating track.*

*27. An adult back portion of an adult seating unit, having a child seat convertible from a closed position within said adult back portion to an open position for acommodating a child user, comprising:*

*a frame;*

*a child seat cushion defined by a portion of said back portion, separable from the remainder of said back portion, and pivotally connected with said back portion to pivot between a closed position, in which said child seat cushion is positioned generally flush within said back portion to provide support for the back of an adult user, and an open position, in which said child seat cushion extends generally horizontally forward from said back portion to provide a child seat for a child user;*

*a child back support defined by a second portion of said adult back portion, connected with said frame, and positioned generally within said adult back portion, adjacent said child seat cushion, when said child seat cushion is in said closed position;*

*a pivot connected between said frame and said adult back portion, near an upper edge of said adult back portion; and*

*a slide connected between said pivot and one of said frame and said adult back portion so said child back support rotates and slides to incline said child back support for receiving and supporting a child in an inclined position;*

*said frame further including at least one brace having an upper end connected with said pivot near an upper edge of the adult back portion, and having an opposing lower end, said child back support being connected with said first member; and including at least one rod having an end pivotally connected with said lower end of said at least one brace and having an opposing end pivotally connected with the adult back portion at a location generally vertically spaced below said upper end of said at least one brace, said child seat cushion having an edge and being pivotally connected near said edge with said rod;*

*said at least one brace slides along said slide and rotates about said pivot so said child back support rotates and slides generally vertically to incline said child back support.*

*28. The adult back portion defined in claim 27 wherein said at least one rod is a telescoping member so said child seat cushion slides between an extended position and a retracted position relative to the adult back portion.*

*29. A adult seating unit which is convertible to a child seat for accommodating a child user, said child seat being built into said adult seating unit and being convertible from a closed position wherein said child seat is stored to an open position for use by a child, comprising:*

*an adult back portion of said adult seating unit;*

*a frame connected with said adult back portion, said frame having a frame top and an opposing frame bottom;*

*a child seat cushion defined by a portion of said adult back portion, separable from the remainder of said adult back portion, and pivotally connected with said frame, near said frame bottom, to pivot between a closed position in which said child seat cushion is positioned generally flush within said adult back portion to provide support for the back of an adult user, and an open position in which said child seat cushion extends generally horizontally forward from said adult back portion to provide a child seat for a child user;*

*a pivot connected between said frame, near said frame top, and said adult back portion, so said frame rotates about said pivot;*

*a slide connected between said pivot and one of said frame and said adult back portion, so said frame bottom extends generally horizontally away from a bottom of said adult back portion and retracts generally horizontally into said adult back portion with rotation of said frame about said pivot; and*

*a child back support defined by a second portion of said adult back portion to receive and support a child, said child back support being connected with said frame so said child back support rotates and slides to selectively incline said child back support between relatively more upright and relatively more inclined positions when said child seat cushion is in said open position, said child back support being positioned generally within said adult back portion, adjacent said child seat cushion, when said child seat cushion is in said closed position.*

*30. An adult seating unit which is convertible to a child seat for accommodating a child user, said child seat being built into said adult seating unit and being convertible from a closed position wherein said child seat is stored to an open position for use by a child, comprising:*

*an adult back portion of said adult seating unit;*

*a frame connected with said adult back portion, said frame having a frame lower end and at least one extensible member extending from said frame lower end;*

*a child seat cushion defined by a portion of said adult back portion, separable from the remainder of said adult back portion, and pivotally connected with said frame to pivot between a closed position in which said child seat cushion is positioned generally flush within said adult back portion to provide support for the back of an adult user, and an open position in which said child seat cushion extends generally horizontally forward from said adult back portion to provide a child seat for a child user;*

*a pivot connected between said frame and said adult back portion, said extensible member of said frame having a first end pivotally connected with said frame and an opposing end pivotally connected with said adult back portion at a location generally vertically spaced below said pivot connected between said frame and said adult back portion;*

*a slide connected between said pivot and one of said frame and said adult back portion; and*

*a child back support defined by a second portion of said adult back portion, connected with said frame to said child back support rotates and slides to selectively incline said child back support for receiving and supporting a child in a selected inclined position, and positioned generally within said adult back portion, adjacent said child seat cushion when said child seat cushion is in said closed position.*

*31. The seat defined in claim 30 wherein said slide includes a slide member and a cooperating track.*

*32. An adult seating unit which is convertible to a child seat for accommodating a child user, said child seat being built into said adult seating unit and being convertible from a closed position wherein said child seat is stored to an open position for use by a child, comprising:*

*an adult back portion of said adult seating unit;*

*a frame connected with said adult back portion;*

*a child seat cushion defined by a portion of said adult back portion, separable from the remainder of said adult back portion, and pivotally connected with said frame to pivot between a closed position in which said child seat cushion is positioned generally flush within said adult back portion to provide support for the back of an adult user, and an open position in which said child seat cushion extends generally horizontally forward from said adult back portion to provide a child seat for a child user;*

*a pivot connected between said frame and said adult back portion;*

*a slide including a slide member and a cooperating track, said slide being connected between said pivot and one of said frame and said adult back portion; and*

*a child back support defined by a second portion of said adult back portion, connected with said frame so said child back support rotates and slides to incline said child back support for receiving and supporting a child in an inclined position, and positioned generally within said adult back portion, adjacent said child seat cushion when said child seat cushion is in said closed position;*

*said frame further including at least one brace having an upper end connected with said pivot near an upper edge of said adult back portion and having an opposing lower end, said child back support being connected with said first member; and including at least one rod having an end pivotally connected with said lower end of said at least one brace and having an opposing end pivotally connected with said adult back portion at a location generally vertically spaced below said upper end of said at least one brace, said child seat cushion having an edge and being pivotally connected near said edge with said at least one rod, said at least one rod is a telescoping member so said child seat cushion slides between an extended position and a retracted position relative to said adult back portion.*

*33. An adult seating unit which is convertible to a child seat for accommodating a child user, said child seat being built into said adult seating unit and being convertible from a closed position wherein said child seat is stored to an open position for use by a child, comprising:*

*an adult back portion of said adult seating unit;*

*a frame connected with said adult back portion;*

*a child seat cushion defined by a portion of said adult back portion, separable from the remainder of said adult back portion, and pivotally connected with said frame to pivot between a closed position in which said child seat cushion is positioned generally flush within said adult back portion to provide support for the back of an adult user, and an open position in which said child seat cushion extends generally horizontally forward from said adult back portion to provide a child seat for a child user;*

*a pivot connected between said frame and said adult back portion;*

*a slide connected between said pivot and one of said frame and said adult back portion; and*

*a child back support defined by a second portion of said adult back portion, connected with said frame so said child back support rotates and slides to incline said child back support for receiving and supporting a child in an inclined position, and positioned generally within said adult back portion, adjacent said child seat cushion when said child seat cushion is in said closed position;*

*said frame further including at least one brace having an upper end connected with said pivot near an upper edge of said adult back portion and having an opposing lower end, said child back support being connected with said at least one brace; and including at least one rod having an end pivotally connected with said lower end of said at least one brace and having an opposing end pivotally connectd with said adult back portion at a location generally vertically spaced below said upper end of said at least one brace, said child seat cushion having an edge and being pivotally connected near said edge with said at least one rod, said at least one brace slides along said slide and rotates about said pivot so said child back support rotates and slides generally vertically to incline said child back support.*

*34. The seat defined in claim 33 wherein said at least one rod is a telescoping member so said child seat cushion slides between an extended position and a retracted position relative to said adult back portion.*

* * * * *

UNITED STATES PATENT AND TRADEMARK OFFICE

CERTIFICATE OF CORRECTION

PATENT NO. : RE. 34,868
DATED : February 28, 1995
INVENTOR(S) : Louis M. Vander Stel et al.

It is certified that error appears in the above-identified patent and that said Letters Patent is hereby corrected as shown below:

Column 4, claim 2, line 42;
"exgending" should be --extending--.

Column 6, claim 6, line 60;
"with" should be --within--.

Column 7, claim 8, line 3;
"whrein" should be --wherein--.

Column 9, claim 12, line 32;
"extendable" should be --extensible--.

Column 10, claim 14, line 8;
"side" should be --sides--.

Column 15, claim 30, line 65;
"to" should be --so--.

Signed and Sealed this

Seventeenth Day of October, 1995

*Attest:*

Bruce Lehman

BRUCE LEHMAN

*Attesting Officer*

*Commissioner of Patents and Trademarks*